United States Patent
Yanahara et al.

(10) Patent No.: US 12,337,512 B2
(45) Date of Patent: Jun. 24, 2025

(54) CONVEYANCE APPARATUS, INJECTION MOLDING SYSTEM, AND CONTROL METHOD

(71) Applicants: Canon Virginia, Inc., Newport News, VA (US); CANON U.S.A., INC., Melville, NY (US)

(72) Inventors: Yuichi Yanahara, Moriyama (JP); Junko Tajima, Irvine, CA (US); Yohei Minatoya, Bunkyo-ku (JP)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 538 days.

(21) Appl. No.: 17/611,498

(22) PCT Filed: May 13, 2020

(86) PCT No.: PCT/US2020/032755
§ 371 (c)(1),
(2) Date: Nov. 15, 2021

(87) PCT Pub. No.: WO2020/236496
PCT Pub. Date: Nov. 26, 2020

(65) Prior Publication Data
US 2022/0212382 A1    Jul. 7, 2022

Related U.S. Application Data

(60) Provisional application No. 62/849,697, filed on May 17, 2019, provisional application No. 62/849,625, filed on May 17, 2019.

(51) Int. Cl.
*B29C 45/17*    (2006.01)
*B29C 45/04*    (2006.01)

(52) U.S. Cl.
CPC ...... *B29C 45/1756* (2013.01); *B29C 45/0408* (2013.01)

(58) Field of Classification Search
CPC ............ B29C 45/1756; B29C 45/0408; B29C 45/1771; B29C 45/08; B29C 45/03
See application file for complete search history.

(56) References Cited

U.S. PATENT DOCUMENTS 1,856,547 A * 5/1932 Gotthardt ................ F16C 33/80
                                                      384/488
3,981,661 A    9/1976 Taylor
(Continued)

FOREIGN PATENT DOCUMENTS

CN    1822448 A    8/2006
CN    107584725 A    1/2018
(Continued)

OTHER PUBLICATIONS

Machine translation of Meiki, JP-2008179061-A, accessed on ESpaceNet Nov. 17, 2023 (Year: 2008).*
Dodge mounted bearings: grease basics (Year: 2009).*

*Primary Examiner* — Alison L Hindenlang
*Assistant Examiner* — Erica Hartsell Funk
(74) *Attorney, Agent, or Firm* — Canon U.S.A., Inc., IP Division

(57) ABSTRACT

A method for an injection molding system including an injection molding machine that includes a supporting member for movably supporting the mold at a molding operation position and a conveyance apparatus that includes a supporting member for supporting the mold and that extends from the conveyance apparatus into the injection molding machine includes performing an injection molding process with a first mold at the molding operation position, unloading the first mold from the molding operation position, loading a second mold to the molding operation position, (Continued)

and opening the second mold at the molding operation position while at least a part of the first mold is on a section of the supporting member of the conveying apparatus extending into injection molding machine.

19 Claims, 14 Drawing Sheets

(56) References Cited

U.S. PATENT DOCUMENTS

| | | |
|---|---|---|
| 4,449,907 A | 5/1984 | Yonezawa et al. |
| 4,472,127 A | 9/1984 | Cyriax et al. |
| 4,500,274 A * | 2/1985 | Cyriax ................. B29C 33/305 |
| | | 425/185 |
| 5,017,121 A | 5/1991 | Hehl |
| 5,063,648 A | 11/1991 | Yonezawa et al. |
| 6,955,210 B2 | 10/2005 | Matsuura et al. |
| 11,104,050 B2 | 8/2021 | Nakamura |
| 2006/0279023 A1 | 12/2006 | Walsh |
| 2014/0035199 A1 | 2/2014 | Kotitsschke et al. |
| 2018/0009146 A1 | 1/2018 | Nakamura |

FOREIGN PATENT DOCUMENTS

| | | | |
|---|---|---|---|
| DE | 102015207704 A1 | 10/2016 | |
| JP | S54-127837 A | 10/1970 | |
| JP | H04319416 A | 11/1992 | |
| JP | 06-039872 A | 2/1994 | |
| JP | 2001-018232 A | 1/2001 | |
| JP | 2008179061 A * | 8/2008 | ......... B29C 45/1704 |
| JP | 2009-023268 A | 2/2009 | |
| JP | 6121601 B1 | 4/2017 | |

* cited by examiner

CONVEYANCE APPARATUS, INJECTION MOLDING SYSTEM, AND CONTROL METHOD

CROSS-REFERENCE TO RELATED APPLICATION

This application claims the benefit of U.S. Provisional Application 62/849,697 and U.S. Provisional Application 62/849,625, which were filed on May 17, 2019.

FIELD

The present disclosure relates to an injection molding system.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In the above-described molding approach, a method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. In this system, cooling of the molds 100A or 100B is performed on the conveying machines 3A or 3B outside of the injection molding machine 2. During cooling of one of the molds 100A/100B, each process of molded part ejection→clamping→injection/dwelling is performed by the injection molding machine 2 for the other mold 100A/100B.

In US 2018/0009146/Japanese patent publication No. 2018-001738/VN20160002505, roller supporting body 620 is fixed on both sides in the X-axis direction of the fixed platen 61 and the movable platen 62, and a plurality of rollers BR is supported by the roller supporting body 620. With this configuration, the conveyor machines 3A and 3B are arranged laterally with respect to the injection molding machine 2 and convey the mold close to the injection molding machine 2. After that, the plurality of rollers BR in the injection molding machine 2 can move the mold. However, in this configuration, when the movable platen 62 moves for opening the mold, the roller supporting body 620 and the plurality of rollers BR connected with the movable platen 62 move together. That is, when the above sequence is performed, a mold which is being cooled cannot wait on the plurality of rollers BR. Accordingly, the mold needs to wait a little apart from the injection molding machine 2, and a time required to move the mold from a waiting position to a molding operation position is long.

SUMMARY

According to at least one aspect of the present disclosure, a method for an injection molding system including an injection molding machine that includes a supporting member for movably supporting the mold at a molding operation position and a conveyance apparatus that includes a supporting member for supporting the mold and that extends from the conveyance apparatus into the injection molding machine includes performing an injection molding process with a first mold at the molding operation position, unloading the first mold from the molding operation position, loading a second mold to the molding operation position, and opening the second mold at the molding operation position while at least a part of the first mold is on a section of the supporting member of the conveying apparatus extending into injection molding machine.

This and other embodiments, features, and advantages of the present disclosure will become apparent upon reading the following detailed description of exemplary embodiments of the present disclosure, when taken in conjunction with the appended drawings, and provided claims.

Figure 1:
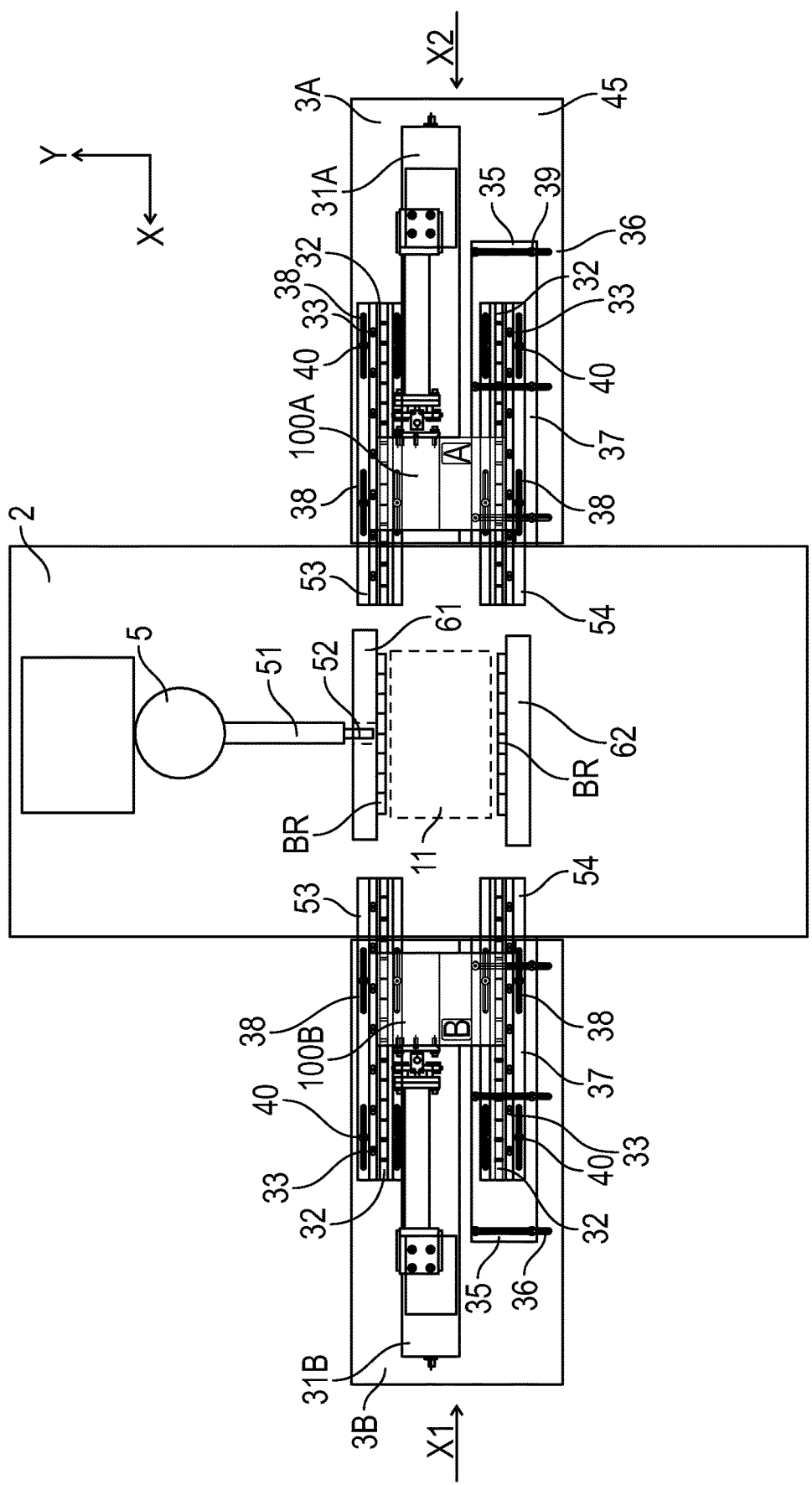
FIG. 1 illustrates an injection molding system according to an exemplary embodiment.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, the arrow symbols X and Y in each Figure indicate horizontal directions that are orthogonal to each other, and the arrow symbol Z indicates a vertical (upright) direction with respect to the ground.

Figure 3:
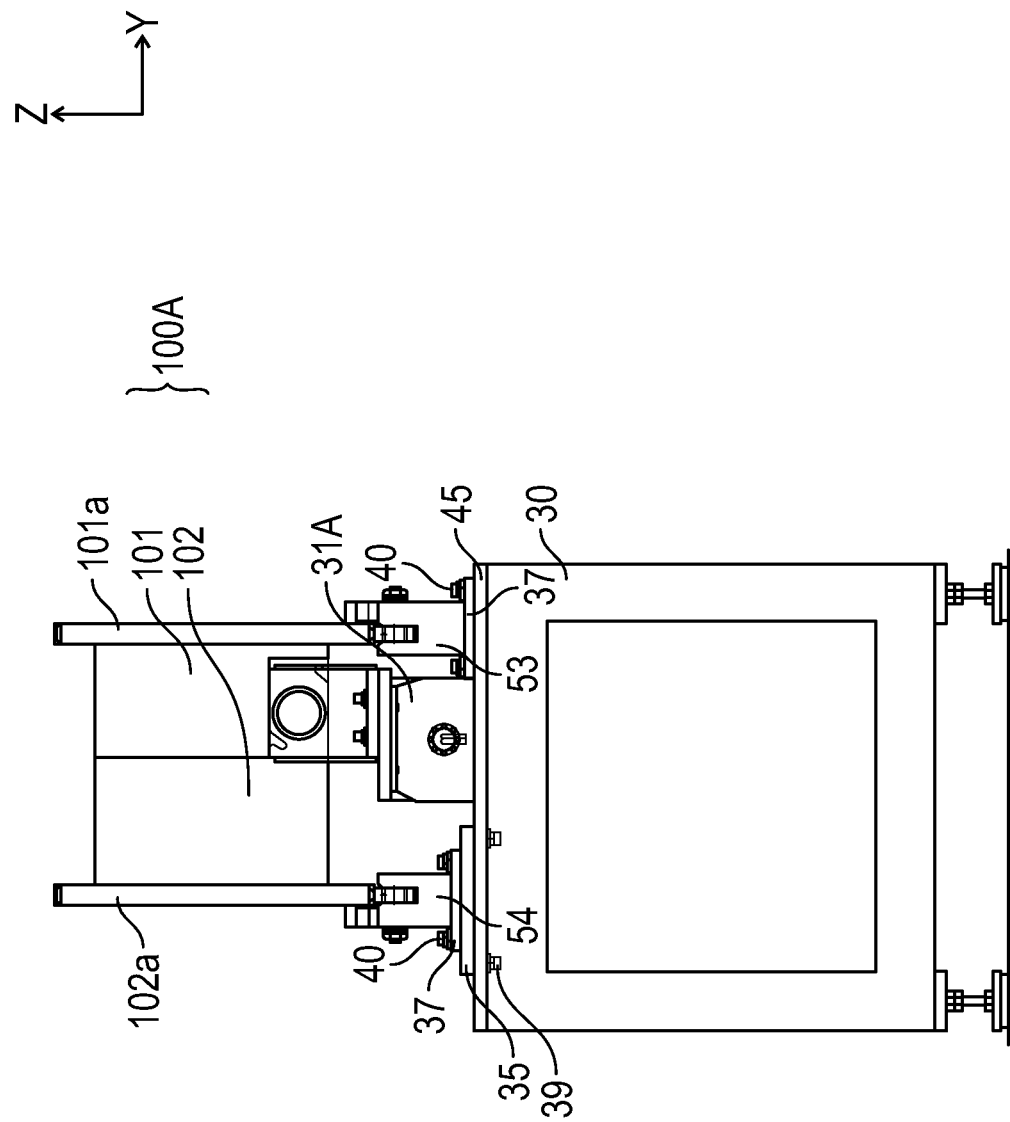
FIG. 3 illustrates a side view of an injection molding machine.
Figure 10:
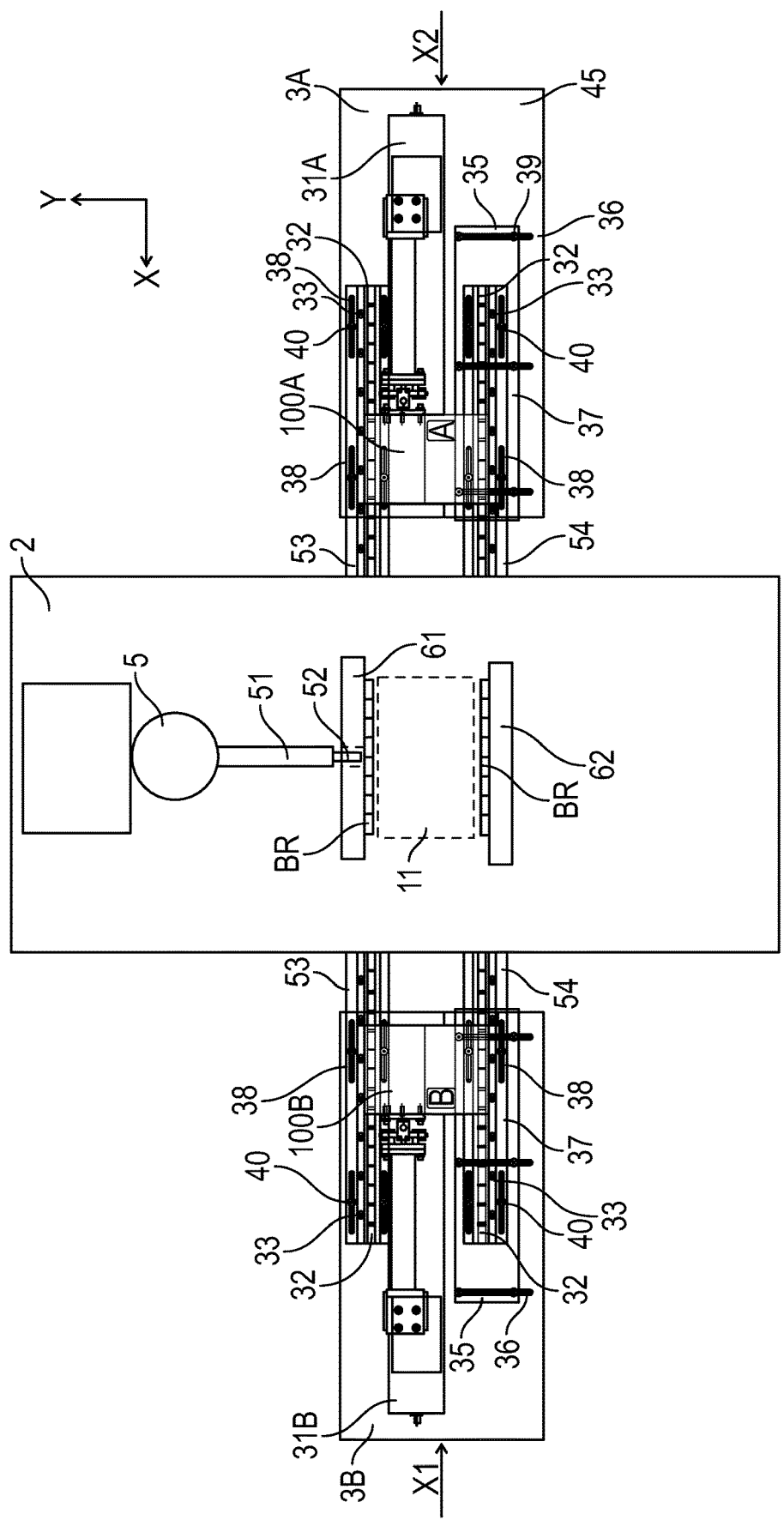
FIG. 10 illustrates an injection molding system.
Figure 11:
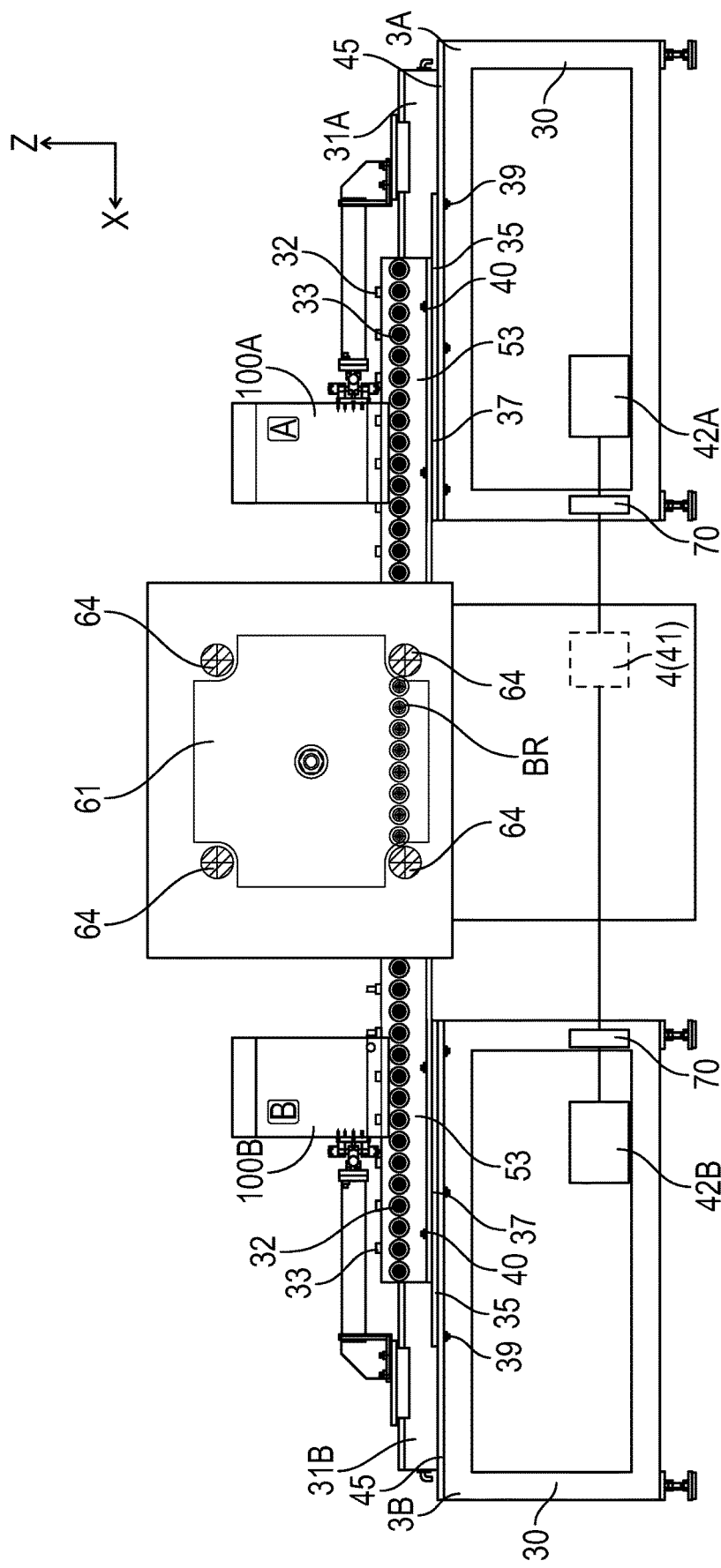
FIG. 11 illustrates an injection molding system.

FIGS. 10, 11, and 3 illustrate an injection molding system discussed in US 2018/0009146/Japanese patent publication No. 2018-001738/VN20160002505 and is being provided herein for information/description purposes only. FIG. 10 illustrates a top view of the injection molding system. FIG. 11 illustrates a cross-sectional view of a line X1-X2 in FIG. 10. FIG. 3 illustrates a side view of the injection molding system when viewed in the X-axis direction.

The injection molding system comprises an injection molding machine 2, a conveyor machine 3A that conveys a mold 100A into the injection molding machine 2, and a conveyor machine 3B that conveys a mold 100B into the injection molding machine 2. The injection molding system also includes a control apparatus (not illustrated). The injection molding system manufactures molded parts by alternating a plurality of molds, e.g., 100A and 100B, via conveying machines, e.g., 3A and 3B. Molds 100A and 100B each include a fixed mold, e.g., 101, and a moveable mold, e.g., 102, where the moveable mode 102 is opened/closed with respect to the fixed mold 101. The molded part is molded by injecting a molding material, e.g., molten resin, into a cavity formed between the fixed mold 101 and the movable mold 102.

Conveying machine 3A moves the mold 100A to/from a molding operation position 11 of the injection molding machine 2. Conveying machine 3B moves the mold 100B to/from the molding operation position 11. The molding operation position 11 is a region between a fixed platen 61 and a movable platen 62. A mold 100A/100B introduced into the molding operation position 11 is clamped between the fixed platen 61 and the movable platen 62.

Clamping plates 101*a* and 102*a* are respectively fixed to the fixed mold 101 and the movable mold 102. The clamping plates 101*a* and 102*a* are used to fix the mold 100A/100B in the molding operation position 11.

The conveying machine 3A and the conveying machine 3B are arranged adjacently on respective sides along the X-axis direction with respect to the injection molding machine 2. The molding operation position 11 is located between the conveying machine 3A and the conveying machine 3B.

The conveying machines 3A and 3B respectively include a base frame 30, a conveyance unit 31A and 31B, a plurality of rollers 32, and a plurality of rollers 33. The conveyance unit 31A31B is an apparatus that moves the mold 100A/100B back and forth in the X-axis direction, and that removes and inserts the mold 100A/100B in relation to the molding operation position 11. The base frame 30 respectively supports a table 45, a conveyance unit 31A/31B, the plurality rollers 32, and the plurality of rollers 33.

The conveyance unit 31A/31B is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality of rollers 32 are a row of rollers arranged in the X-axis direction and two rows are configured separated in the Y-axis direction. The plurality of rollers 32 rotate around the axis of revolution in the Z-axis direction. The plurality of rollers 32 regulate movement in the Y-axis direction and guide movement in the X-axis direction of the molds 100A/100B and contact the side surfaces of the molds 100A/100B and support the molds 100A/100B from the side.

The plurality of rollers 33 are a row of rollers arranged in the X-axis direction, and two rows are configured separated in the Y-axis direction. The plurality of rollers 33 rotate around the axis of revolution in the Y-axis direction, and regulate movement in the X-axis direction of the molds 100A/100B to be smooth. The plurality of rollers 33 support the bottom surfaces of the molds 100A/100B and support the molds 100A/100B from below.

Supporting member 53 and supporting member 54 are provided on the table 45. The plurality of rollers 32 and the plurality of rollers 33 are provided on both supporting member 53 and supporting member 54. Supporting member 53 is located on the side of the injection molding system that a fixed platen 61 is located, while supporting member 54 is located on a side of the injection molding system that a movable platen 62 is located. The supporting member 53 and the supporting member 54 are approximately the same height as a he injection molding machine.

Both the supporting member 53 and the supporting member 54 include a slidable mechanism in the X-axis direction. A board 37 under the supporting member 53 and supporting member 54 respectively, and a long hole 38 in the X-axis direction is formed on the board 37. Both the supporting member 53 and the supporting member 54 can slide along the hole and respectively fixed at an arbitrarily position to the table 45 by a fastening member 40. The supporting member 54 is also slidable in the Y-axis direction. A board 35 is located between the board 37 and the table 45. A long hole 36 in the Y-axis direction is formed on the board 35. The supporting member 54 can slide along the long hole 36, while the supporting member 54 is fixed at an arbitrarily position to the table 45 by a fastening member 39.

A plurality of rollers BR is located on an inner surface of the fixed platen 61 and the movable platen 62 and the fixed platen 61. The plurality of rollers BR are free to rotate around the axis of revolution in the Y-axis direction and cause movement in the X-axis direction of the molds 100A/100B to be smooth.

The rollers BR located at the molding operation position 1, which is between the fixed platen 61 and the movable platen 62, provide support for the mold 100A/100B when the mold 100A/100B is moved to the molding operation position 11. The supporting member 53 and the supporting member 54 are approximately at the same height as the BR rollers located at the molding operation position 1.

The injection molding machine includes an injection cylinder 51 that includes a heating device (not illustrated) for melting a molding material introduced from a hopper 5. The melted molding material is injected from an injection nozzle 52 to manufacture the molded part.

The injection molding system also includes tie-bars 64, a clamping apparatus (not illustrated), and a take-out robot (not illustrated) for ejecting/removing the molded part.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B include, for example, a processor such as a CPU, a RAM, a ROM, a storage device such as a hard disk, interfaces connected to sensors or actuators, etc. The processor executes programs stored in the storage device. A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

The controller 41 is communicably connected with the controllers 42A and 42B, and provides instructions related to the conveyance of the molds 100A/100B to the controllers 42A and 42B. The controllers 42A and 42B, if loading and unloading of the molds 100A/100B terminates, transmit a signal for operation completion to the controller 41, and also transmit an emergency stop signal upon an abnormal occurrence to the controller 41. A connecting unit 70 connects a signal line from the controller 4 to the controller 42A and the controller 42B respectively under the table 45.

Figure 2:
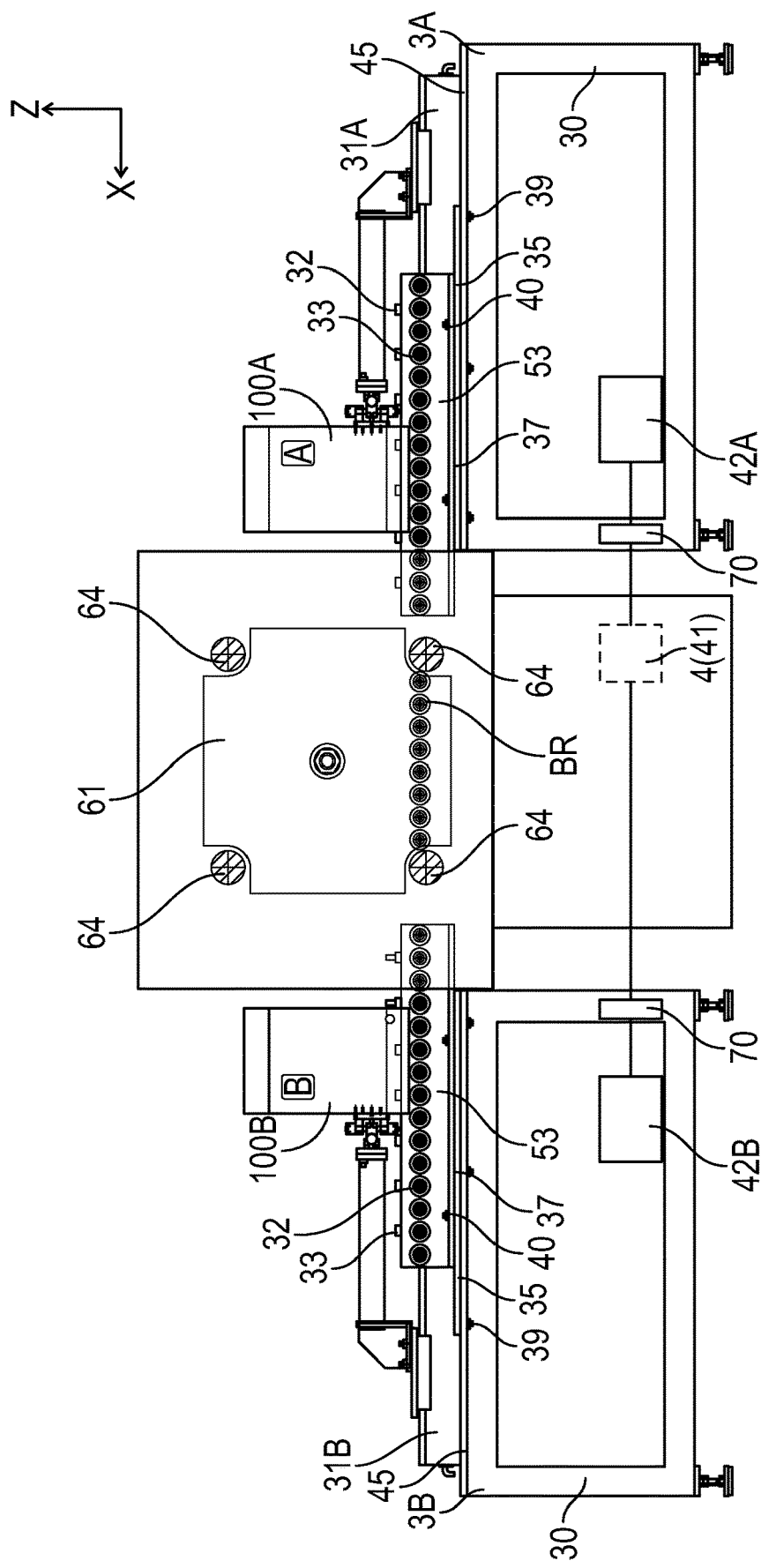
FIG. 2 illustrates a sectional view of an injection molding machine according to an exemplary embodiment.

FIGS. 1 and 2 illustrate an injection molding system according to an exemplary embodiment and provides an improvement of the configuration illustrated in FIGS. 10, 11, and 3. FIG. 1 illustrates a top view of the injection molding system. FIG. 2 illustrates a cross sectional view of a line X1-X2 in FIG. 1. The same reference numbers from FIGS. 10-11 are repeated in FIGS. 1-2, and as such, detailed descriptions are omitted herein.

As illustrated in FIGS. 1-2, both the supporting member 53 and the supporting member 54 protrude from the base frame 30 into the injection molding machine 2. This configuration results in the distance between the molding operation position 11 and a waiting position (not illustrated) to become shorter compared to the configuration illustrated in FIGS. 10 and 11. In the present embodiment, the waiting position is a position where the mold 100A/100B waits while the mold 100A/100B is cooled. Accordingly, by shortening the distance between the molding operation position 11 and the waiting position, the time and the energy required to move the mold 100A/100B is reduced productivity increased.

Figure 4:
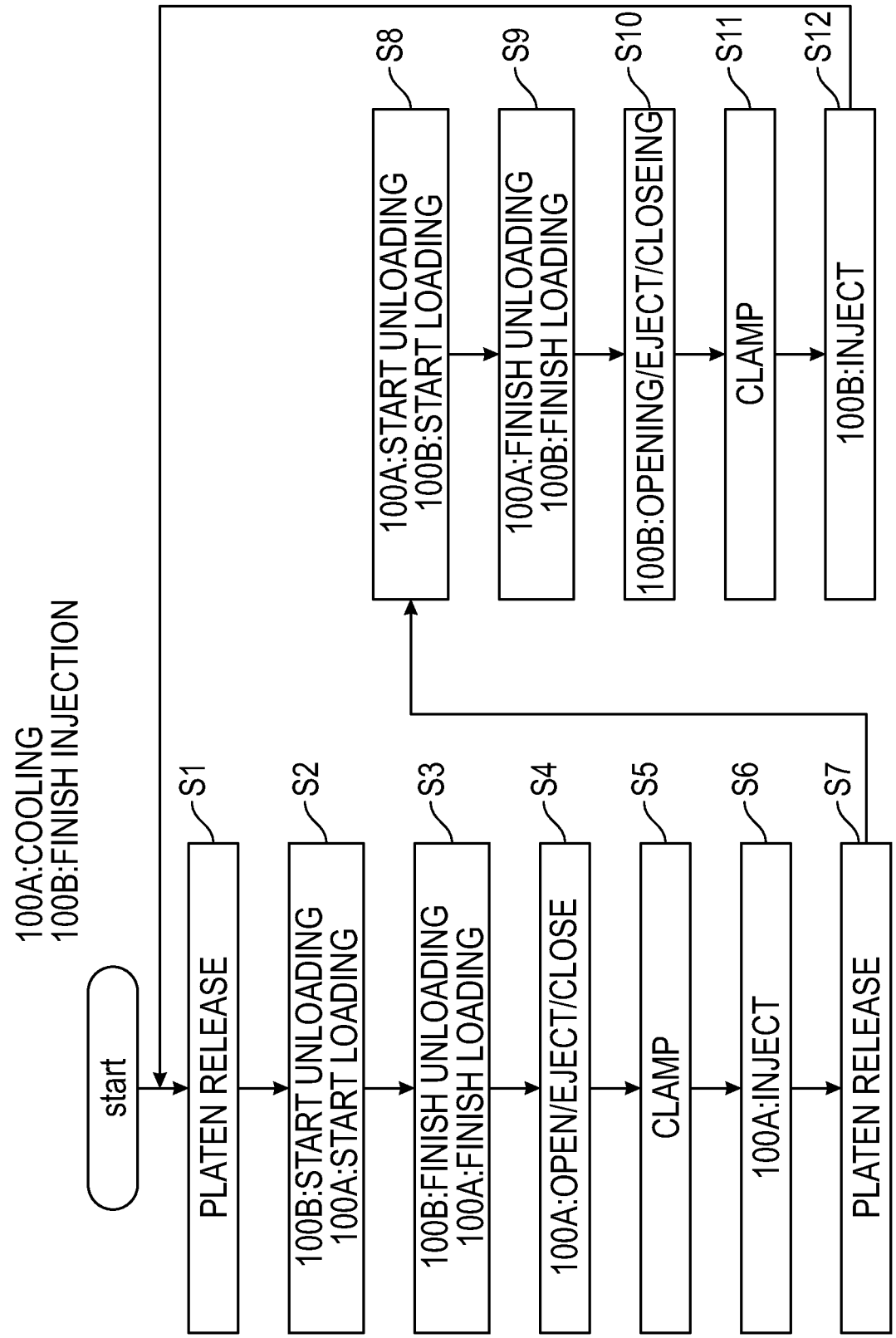
FIG. 4 illustrates a flowchart of an injection molding operation.

FIG. 4 illustrates a flowchart of an injection molding operation.

Before the process of the flowchart is executed, the mold 100A is conveyed from the molding operation position 11 is cooled. The mold 100B is conveyed to the molding operation position 11 and the injection operation for the mold 100B completes.

In S1, releasing of the moveable platen 62 is performed and the moveable platen 62 slightly moves. This enables moving the mold 100B. In S2, unloading of the mold 100B and loading of the mold 100A begins. This results in the mold 100B moving from the molding operation position 11 to the supporting member 53 and supporting member 54 in the conveying machine 3B. In parallel, the mold 100A moves from the supporting member 53 and the supporting member 54 in the conveying machine 3A to the molding operation position 11. The supporting member 53 and supporting member 54 protruding into the injection molding machine 2 as illustrated in FIGS. 1-2 shortens the distance the mold 100A and the mold 100B needs to travel before the process of S3 begins.

In S3, unloading of the mold 100B and loading of the mold 100A completes. The unloading process of the mold 100B is controlled such that a part of the mold 100B is on the supporting member 53 and the supporting member 54 in the conveying machine 3B, and at least a part of the mold 100B is in the injection molding machine 2. In S4, the mold 100A is opened, the molded part is ejected from the mold 100A, and the mold 100A is closed. Based on this process, mold 100A can be opened even though the mold 100B is not completely outside the injection molding machine 2.

In S5, the mold 100A is clamped. In S5, injection molding with the mold 100A is performed. Then, in S7, the moveable platen 62 is released and slightly moves, which makes it possible to move the mold 100A. In S8, unloading of the mold 100A and loading of the mold 100B begins. This results in the mold 100A moving from the molding operation position 11 to the supporting member 53 and the supporting member 54 in the conveying machine 3A. In parallel, the mold 100B moves from the supporting member 53 and the supporting member 54 in the conveying machine 3B to the molding operation position 11. The supporting member 53 and supporting member 54 protruding into the injection molding machine 2 as illustrated in FIGS. 1-2 shortens the distance the mold 100A and the mold 100B needs to travel before the process of S9 begins.

In S9, unloading of the mold 100A and loading of the mold 100B completes. The unloading process of the mold 100A controlled such that a part of the mold 100A is on the supporting member in the conveying machine 3A, and at least a part of the mold 100A is in the injection molding machine 2. In S10, the mold 100B is opened, the molded part is ejected from the mold 100B, and the mold 100B is closed. Based on this process, mold 100B can be opened even though the mold 100A is not completely outside the injection molding machine 2.

In S11, the mold 100B is clamped. In S12, injection molding with the mold 100B is performed. The process then returns to S1, and the injection molding repeats until the number of molded parts manufactured by the injection molding system reaches a predetermined number.

In S3 and S9, all of the unloaded mold can be located in the injection molding machine 2. This can occur when a size of the mold is small and the mold can fit into a space next to the molding operation position 11 in the injection molding machine 2.

Figure 5:
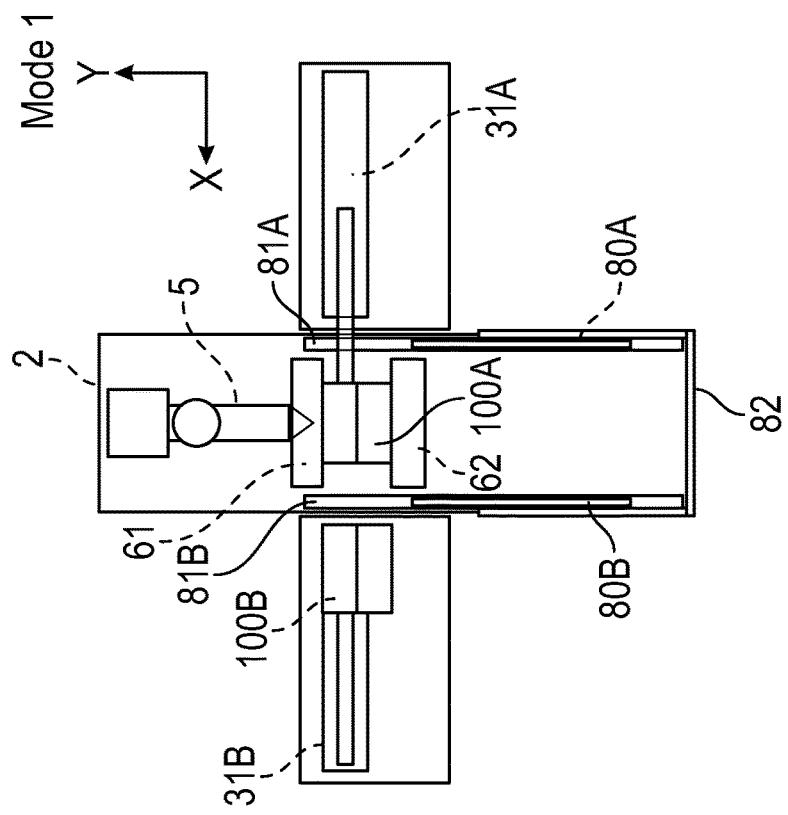
FIG. 5 illustrates an operation of an injection molding machine in a first mode.
Figure 5:
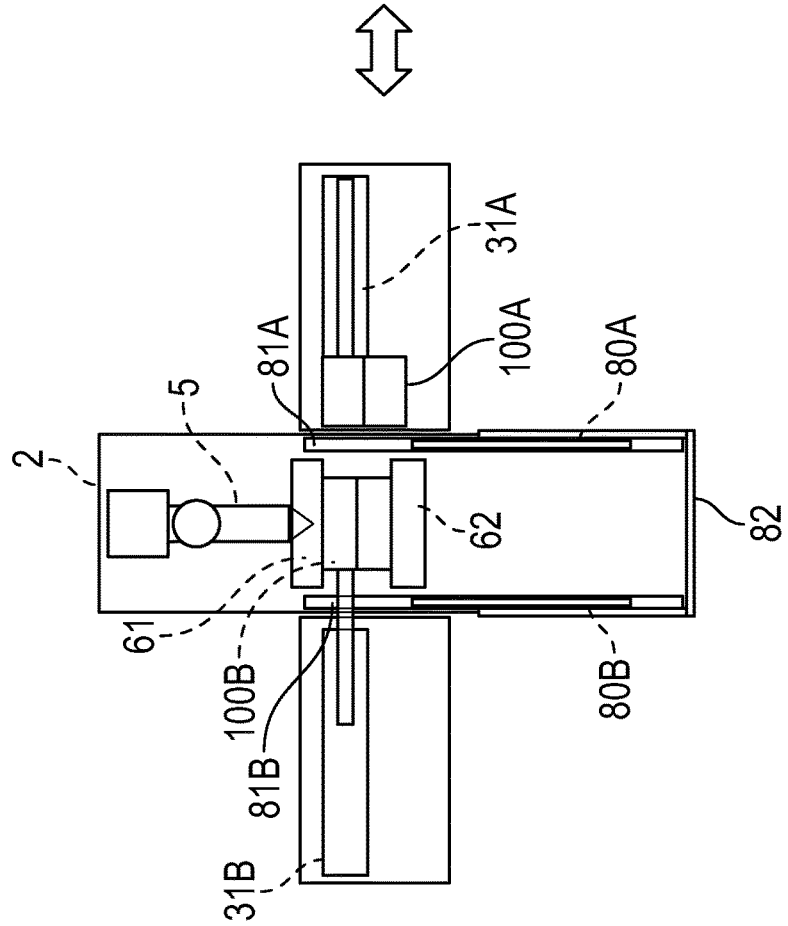
Figure 6:
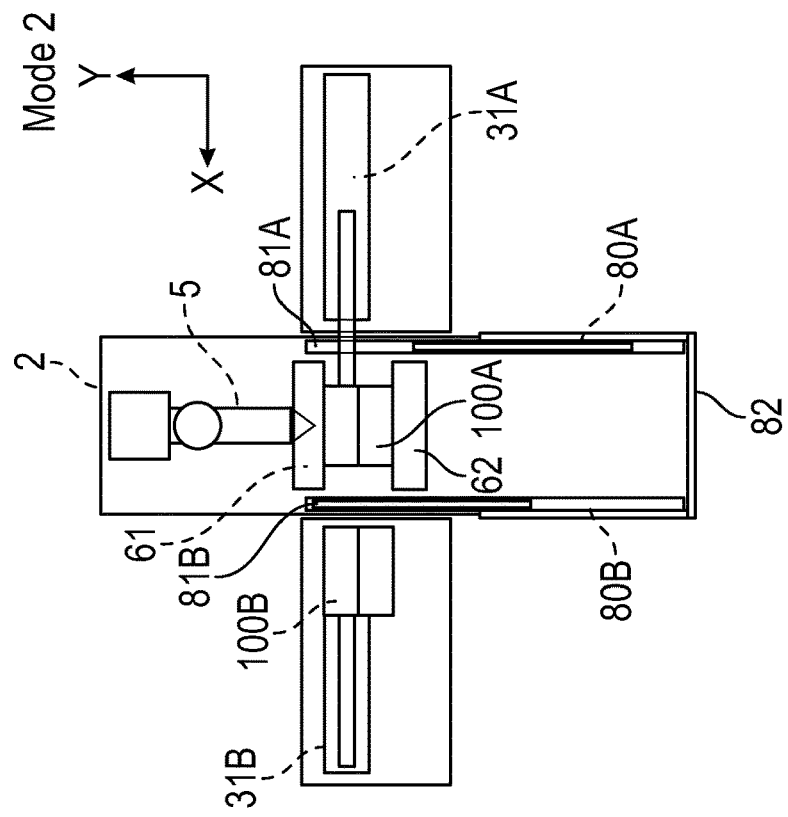
FIG. 6 illustrates an operation of an injection molding machine in a second mode.
Figure 6:
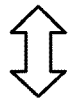
Figure 6:
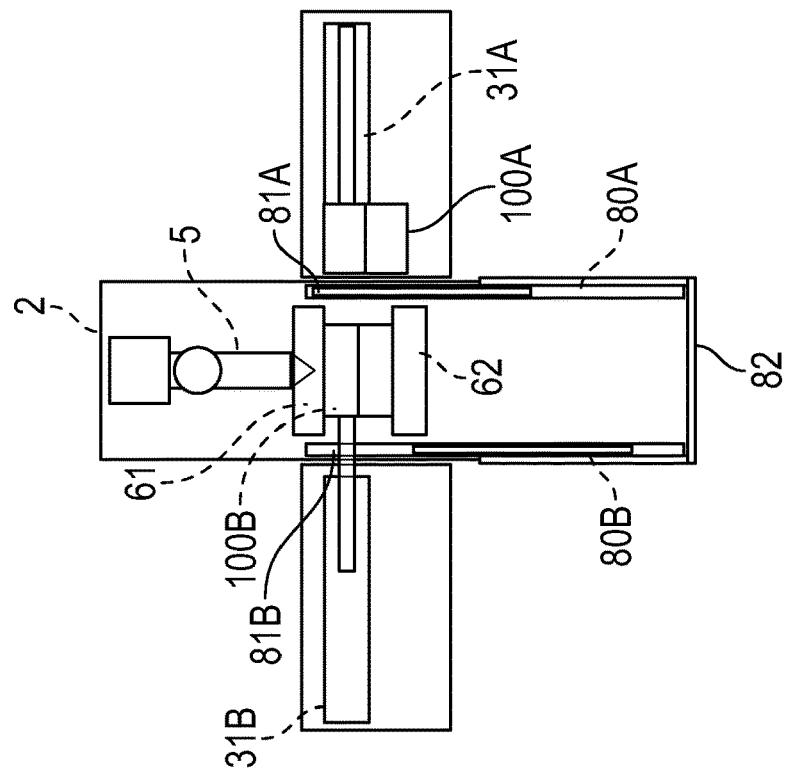

FIGS. 5 and 6 illustrate two operation modes of the injection molding machine 2 controlled by the control apparatus 4.

FIG. 5 illustrates a first operation mode. This mode is performed per the process illustrated in FIG. 4, where one mold is cooled on a conveying machine while injection molding is performed with another mold. The left figure illustrates a state where the mold 100B is conveyed to the molding operation position 11 in the injection molding machine 2 by the conveying machine 3B. The right figure illustrates a state where the mold 100A is conveyed to the molding operation position in the injection molding machine 2 by the conveying machine 3A.

More specifically, the processes in S4-S7 in FIG. 4 are illustrated in the right figure in FIG. 5, and processes in S8-S9 are performed during the transition period from the right figure to the left figure in FIG. 5. The processes in S10-S12 and S1 are illustrated in the left figure in FIG. 5, and the processes in S2-S3 are performed during the transition period from the left figure to the right figure in FIG. 5.

Door portion 80A and door portion 80B are located at a side of the injection molding machine 2. When the door portion 80A and the door portion 80B are placed in an open state, an opening is formed at the side of the injection molding machine 2 and loading/unloading of the mold 100100B by the conveying machine 3A/3B can occur. The door portion 80A and the door portion 80B include a door for enabling or restricting access to an opening 81A and an opening 81B respectively, as well as a door rail to guide the movement of the door.

The door portion 80A/80B define an inner area of the injection molding machine 2. When the doors of the door portion 80A and the door portion 80B are opened, the doors are at least partially accommodated in the door cover 82. The door cover 82 is a side plate that covers the inner components of the injection molding machine 2. The detail configuration of the door portion 80A and the door portion 80B is described below with reference to FIGS. 7-9.

In both the right figure and the left figure in FIG. 5, both the door portion 80A and the door portion 80B are opened so that the mold 100A and the mold 100B can respectively be loaded and unloaded. In this state, the door is partially opened, and a region that is on the movable platen 62 and located at a side opposite to a side facing the fixed platen 61 is not accessible for an operator via the partially opened door. The movable platen 62 repeatedly moves in a clamping direction (+Y-axis direction) and an opening direction (−Y-axis direction) during the injection molding operation. With a partially opened door, the operator cannot contact the movable platen 62 while it moves.

FIG. 6 illustrates a second operation mode. FIG. 6 illustrates the same configuration as illustrated in FIG. 5, except for a position of the door portion 80A and the door portion 80B. The left figure of FIG. 6 illustrates a state where the mold 100B is conveyed to the molding operation position 11 in the injection molding machine 2 by the conveying machine 3B. The right figure of FIG. 6 illustrates a state where the mold 100A is conveyed to the molding operation position 11 in the injection molding machine 2 by the conveying machine 3A. In the second mode, one cycle of the injection molding process includes the cooling process completing at the molding operation position 11 in the injection molding machine 2. That is, the cooling process is not performed on the conveying machine 3, so the unloading process of the mold 100A/100B after finishing the injection and dwelling process and the loading process of the mold 100A/100B before ejecting the molded part are not performed.

A conventional injection molding operation is performed for one mold in the injection molding machine 2. The right figure of FIG. 6 illustrates a state where the injection molding cycle for the mold 100A is repeated a predetermined number of times. After finishing performing the injection molding cycle for the predetermined number of times, the state illustrated in the right figure in FIG. 6 transitions to the state illustrated in the left figure in FIG. 6. The left figure of FIG. 6 illustrates a state where the injection molding cycle for the mold 100B is repeated a predetermined number of times as with the mold 100A. After completing the injection molding cycle the predetermined number of times, the state illustrated in the left figure in FIG. 6 transitions to the state illustrated in the right figure in FIG. 6.

In the state illustrated in the right figure in FIG. 6, in a case where the mold 100B on the conveying machine 3B was previously used, the mold 100B is unloaded from the conveying machine 3B, a new mold is loaded onto the conveying machine 3B, and preparation for the new mold 100B is performed by the operator while injection molding for the mold 100A is repeated. Preparation for the new mold 100B includes connecting an electric power cable or a hose for circulating cooling liquid for adjusting temperature with the mold 100B. When the mold 100B is unloaded from the conveying machine 3B, the electric power cable and hose are removed from the mold 100B. After preparing for the new mold 100B, the new mold 100B is conveyed to the molding operation position 11 in the injection molding machine 2 by the conveying machine 3B after the injection molding operation for the mold 100A is performed. In the state illustrated in the left figure in FIG. 6, the same operation is performed on the conveying machine 3A while the injection molding for the mold 100B is repeated.

Thus, in the second mode, the conveying machine 3A/3B is used for loading the mold 100A/100B before the injection molding cycle starts and unloading the mold 100A/100B after the injection molding cycle finishes. The conveying machine 3A/3B does not move the mold 100A/100B while one cycle of injection molding is performed, similar to the first mode. The second mode is effective for a case a predetermined cycle number set for each of the molds 100A and 100B is small. In other words, a case of small production and the injection molding is performed while the molds 100A and 100B are frequently changed, a large variety of production occurs.

In the state illustrated in the right figure in FIG. 6, as the operator unloads the used mold 100A/100B, loads the new mold 100A/100B, and prepares for the new mold 100A/100B in the vicinity of the conveying machine 3A/3B, a door in the door portion 80A/80B that faces the conveying machine 3A/3B is closed. This enables reducing a possibility that the operator unintentionally touches an operating mechanism.

For example, if the control apparatus 4 stops the injection molding of the mold 100A in a case where it is detected that the door in the door portion 80B is opened while the injection molding of the mold 100A is performed, safety improves. A lock mechanism, such as an electric lock, can be provided at the door in the door portion 80B, and can lock the door while the injection molding of the mold 100A is performed.

In the state illustrated in the left figure in FIG. 6, as the operator unloads the used mold 100A/100B, loads the new mold 100A/100B, and prepares for the new mold 100A/100B in the vicinity of the conveying machine 3A/3B, a door in the door portion 80A/80B that faces the conveying machine 3A/3B is closed. This enables reducing a possibility that the operator unintentionally contacts an operating mechanism.

For example, if the control apparatus 4 stops the injection molding of the mold 100B in a case where it is detected that the door in the door portion 80A is opened while the injection molding of the mold 100B is performed, safety improves. A lock mechanism, such as electric lock, can be provided at the door in the door portion 80A, and the lock mechanism can lock the door while the injection molding on the mold 100B is performed.

A cover with the door can be provided on the conveying machines 3A and 3B so that the cover surrounds the conveying machines 3A and 3B.

Figure 7:
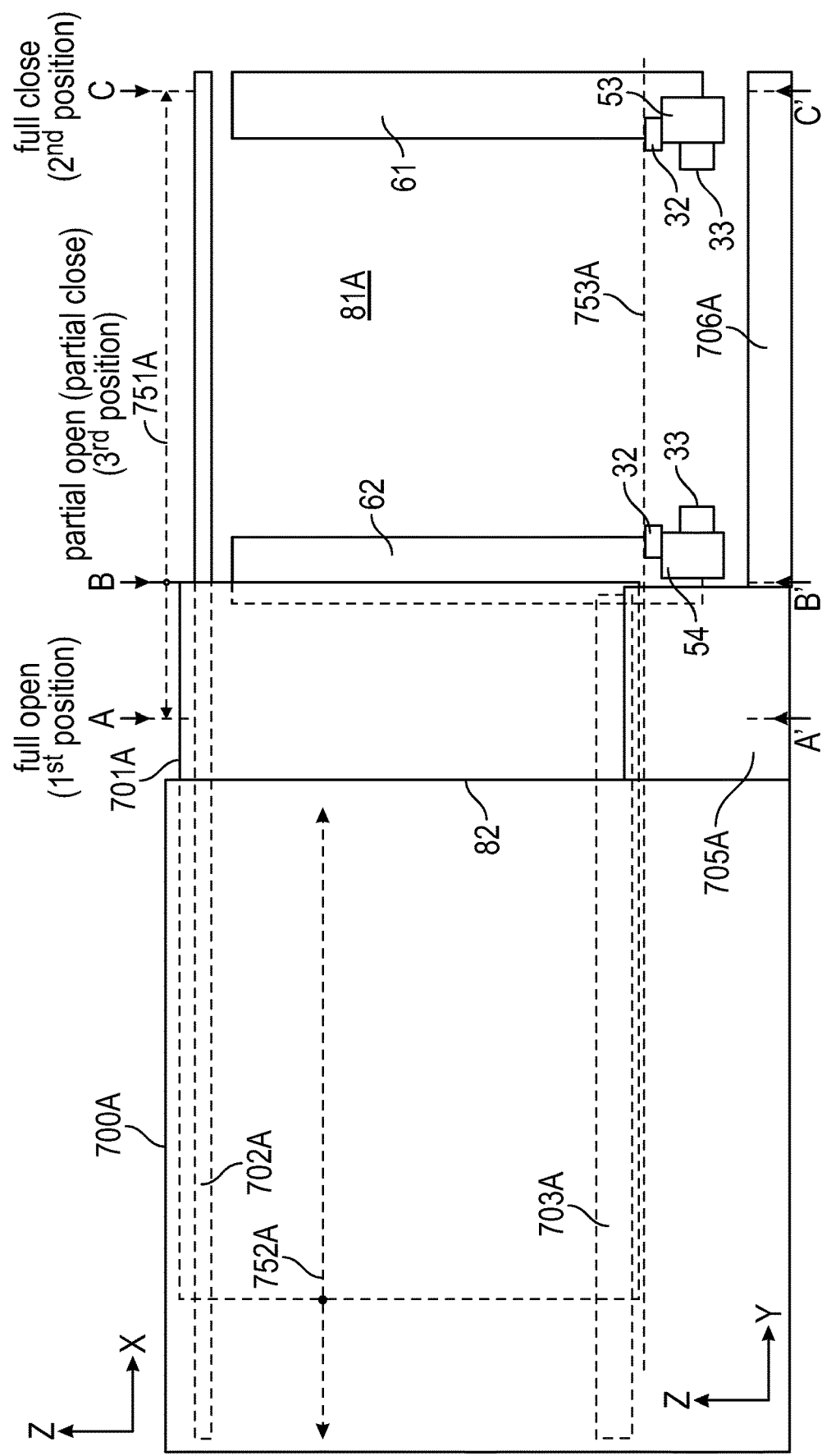
FIG. 7 illustrates a configuration of a door portion provided on a side surface of an injection molding machine.
Figure 8:
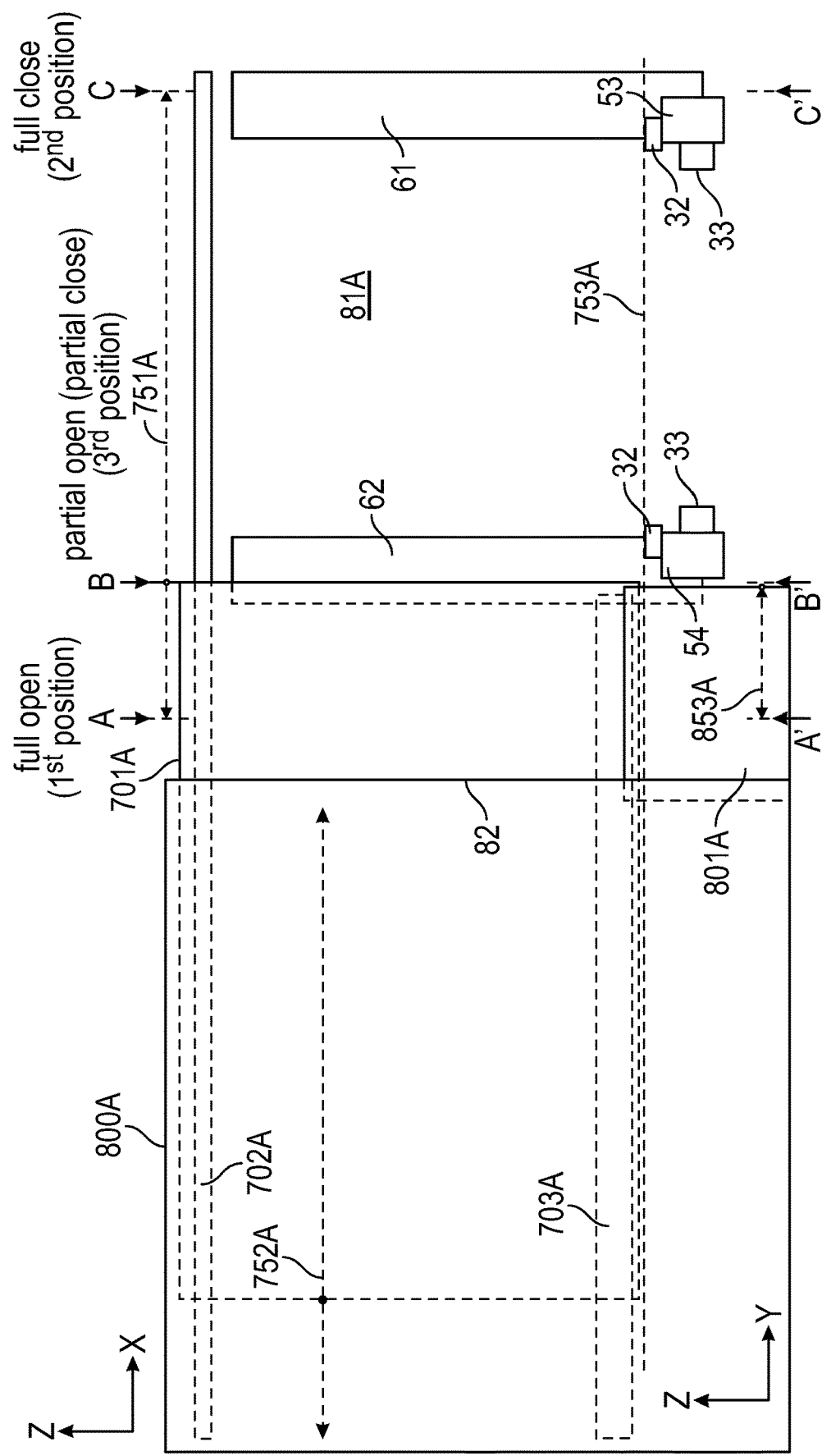
FIG. 8 illustrates a configuration of a door portion provided on a side surface of an injection molding machine.

FIG. 7 and FIG. 8 illustrate a configuration of the door portion 80A/80B suitable for a case where the injection molding machine 2 performs the second mode.

FIG. 7 illustrates an appearance of a door portion 700A as an example of the door portion 80A in the present embodiment when viewed from the conveying machine 3A in the +X-axis direction. The door portion 700A includes a door 701A, an upper guide rail 702A and a lower guide rail 703A for guiding the door in the Y-axis direction, a door cover 82 that accommodates at least a part of the door 701A, a fixed plate 705A that covers a side region of the injection molding machine 2, and a fixed plate 706A that extends to a portion below the row of the plurality of rollers 32 and plurality of rollers 33 in the conveying machine 3A. A distal end of the door 701A is movable between A-A' line and C-C' line in FIG. 7, and the upper guide rail 702A and the lower guide rail 703A guide the movement of the door 701A. Movable area of the distal end of the door 701A is illustrated as an arrow 751A, and movable area of a proximal end of the door 701A is illustrated as an arrow 752A.

A state where the distal end of the door 701A is located at A-A' line (first position) is a completely opened state. In this state, a region of the reverse side of the movable platen 62, which is a region facing a side opposite to a side at fixed platen 61, is exposed. A state where the distal end of the door 701A is located at C-C' line (second position) is a completely closed state, and the opening formed in the injection molding machine 2 for unloading and loading the mold 100A is closed. A state where the distal end of the door 701A is located at B-B' line (third position) is a partially opened state. When the injection molding on the mold 100A is performed, the door 701A is located at the third position. The third position is a position where the distal end of the door 701A is close to an outer side surface of the conveying machine 3A. As described above, in this state, the door 701A does not interfere with unloading of the mold 100A, but the door 701A does cover the region of the reverse side of the movable platen 62.

The door 701A moves in an upper region other than an upper surface 753A of the plurality of rollers 32, the plurality of rollers 33, and the supporting member 53 and the supporting member 54 that support the plurality of rollers 32 and the plurality of rollers 33. That is, the door 701A does not interfere with the plurality of rollers 32 and the plurality of rollers 33 and the supporting member 53 and the supporting member 54 that extend inside the injection molding machine 2, so the door 701A can shift to the completely closed state. It is difficult to cover the side region of the injection molding machine 2 that is next to the supporting member 54 with the door 701A, so the fixed plate 705A is provided for covering this region. It is difficult to cover the side region of the injection molding machine 2 that is below the supporting member 53 and the supporting member 54, so the fixed plate 706 is provided for covering this region.

The door portion 700A defines a border between the inner area of the injection molding machine 2. If the door 701A is closed, the door 701A covers the opening 81A, and an access to the inner area of the injection molding machine 2 from the door portion 700A's side is blocked. If the door 701A is opened, the opening 81A is exposed or formed on the side of the injection molding machine 2 and an access to the inner area of the injection molding machine 2 from the door portion 700A's side is provided. If both the door 701A and the door 701B are closed, the fixed platen 61 and the moveable platen 62 and other components in the injection molding machine 2 are enclosed by the doors 701A and 701B and the door cover 704. In FIG. 7, the door portion 700A is described as an example of the door portion 80A. The door portion 80B also has the same configuration as the door 700A.

In the present embodiment the supporting member 53 and the supporting member 54 extend into the injection molding machine 2. This results in the plurality of rollers 32 and the plurality of rollers 33 on the supporting member 53 and the supporting member 54, and the rollers BR fixed to the injection molding machine 2 forming a guide of the mold 100A/100B conveyed into and out of the injection molding machine 2.

In FIG. 7, the door portion 700A as an example of the door portion 80A is described. The door portion 80B also has the same configuration as the door 700A.

As described above, in the present embodiment, the door portion slides above the guiding mechanism on the conveying machine for guiding the unloading and loading of the mold, and the opening for unloading and loading of the mold can be opened and closed. The door portion provides for, the safety for the operator, as it can reduce the possibility that the operator unintentionally touches the movable platen and the heated mold.

FIG. 8 illustrates an appearance of a door portion 800A as an example of the door portion 80A in another exemplary embodiment when viewed from the conveying machine 3A in the +X-axis direction. The configuration of FIG. 8 is the same configuration as the above-described configuration of FIG. 7, so the reference numbers from FIG. 7 are repeated on FIG. 8. Thus, their description is omitted herein. The door portion 800A includes a door 801A instead of the fixed plates 705A, 706A. The distal end of the door 701A, as stated above, moves between A-A' line (first position) and C-C' line (second position). The distal end of the door 801A only moves between A-A' line (first position) and B-B' line (third position). The movable area of the distal end of the door 801A is illustrated as arrow 853A.

When the injection molding of the mold 100A is performed in the injection molding machine 2, it is necessary to locate the door 801A at the third position for safety purposes. If the door 801A is moved from the third position, the control apparatus 4 stops the injection molding.

This configuration provides for accessing a lower region from the side of the injection molding machine 2.

The door 801A and the door 701A can move independently. In another exemplary embodiment, when the door 701A moves between the first position and the third position, the door 801A engages with the door 701A and moves together with the door 701A. When the door 701A moves over the third position and moves to a side of the second position, the engagement of the door 701A and the door 801A is released, and only the door 701A moves and the door 801A does not move.

Figure 9:
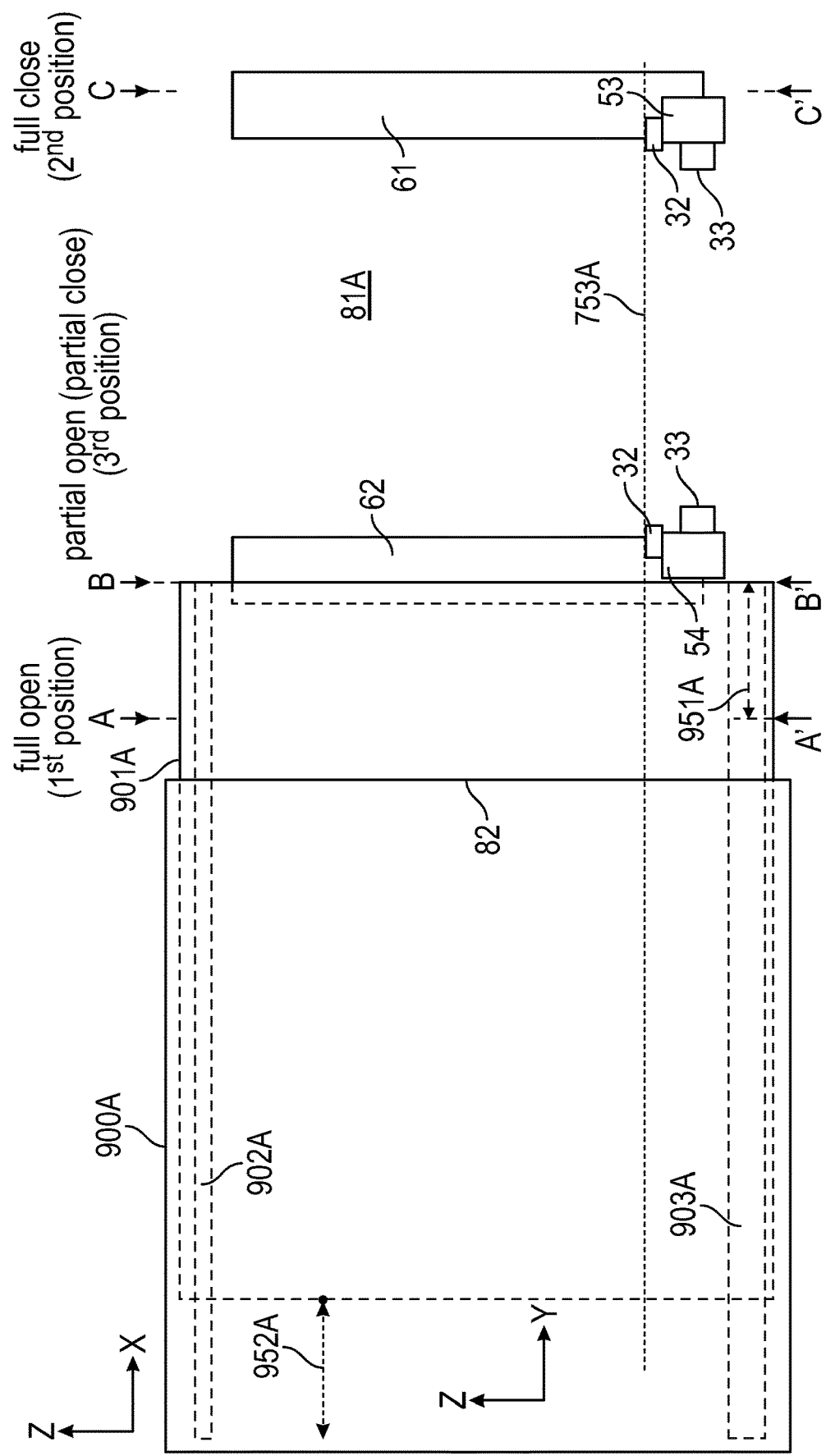
FIG. 9 illustrates a configuration of a door provided on a side surface of an injection molding machine.

If the injection molding machine 2 only operates in the first mode, another configuration of the door in the injection molding machine 2 exists other than the configuration illustrated in FIG. 7 and FIG. 8. FIG. 9 illustrates a configuration of a door portion 900A as an example of the door portion 80A in another exemplary embodiment. FIG. 9 illustrates an appearance of the door portion 900A when viewed from the conveying machine 3A in the +X-axis direction. The location of the first position, second position, and third position and the basic function of the door portion are the same as in the above-described embodiments, only differences in the configuration and different functions of the present embodiment will be described below. Since the same reference numbers as the above-described embodiment are used, their descriptions will be omitted herein.

The door portion 900A includes a door 901A, and a movement of the door 901A in the Y-axis direction is guided by an upper guide 902A and a lower guide 903A. A movable area of a distal end of the door 901A is illustrated as an arrow 951A, and a movable area of another end of the door 901A is illustrated as an arrow 952A. The door 901A covers the upper region of the movable platen 62 to the lower region of the movable platen 62. Since the distal end of the door 901A contacts the supporting member 54, the door 901 cannot move over the third position in a clamping direction. If the injection molding machine 2 only operates the first mode, the door portion 901A does not need to move until the second position (completely closed state), and it is enough to provide the function for covering the region of the reverse side of the movable platen 62.

In another exemplary embodiment, the door portion 900A can be used in the injection molding machine 2 that operates in the second mode along with, other safety measures.

Figure 12:
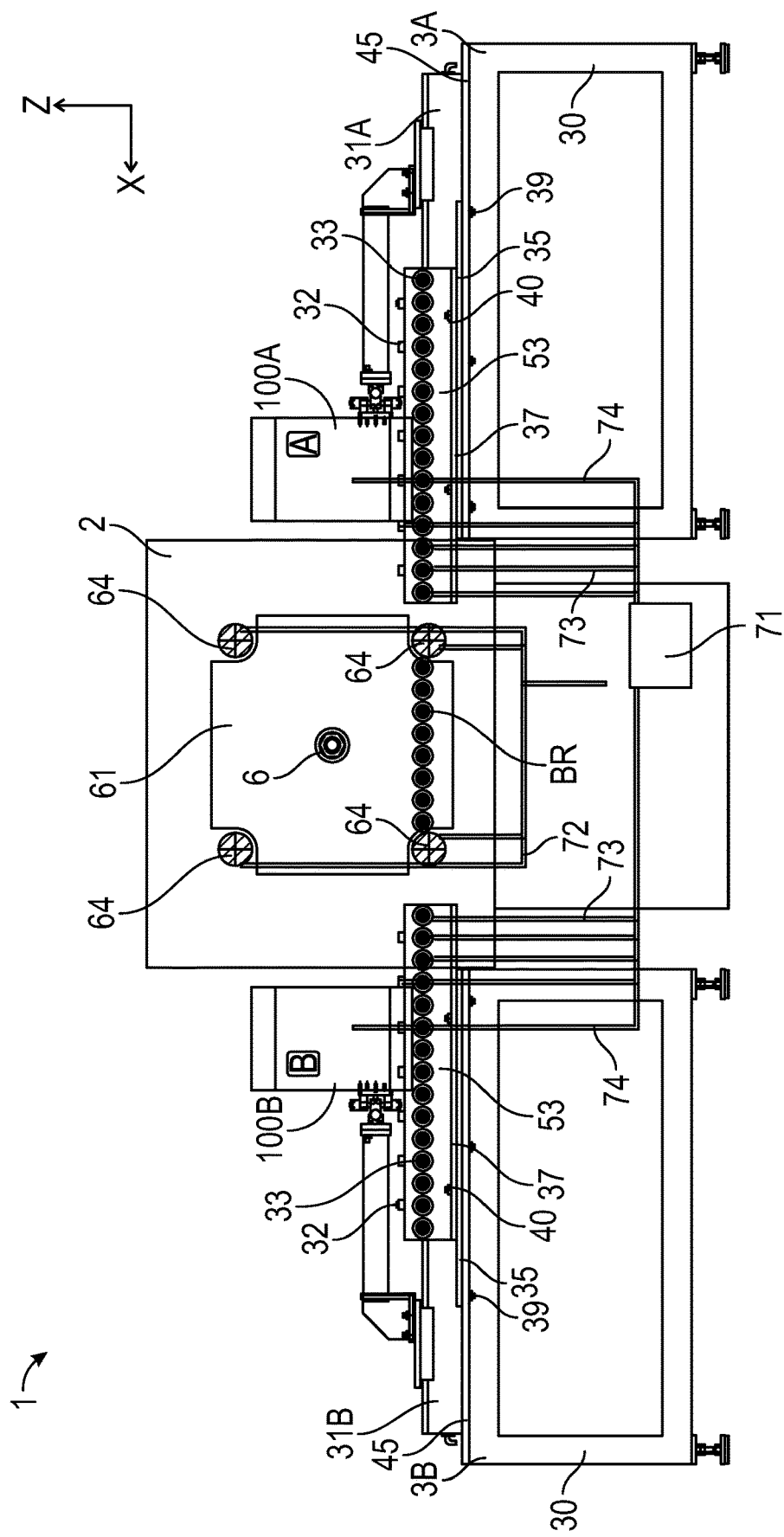
FIG. 12 illustrates an injection molding system.

FIG. 12 illustrates an injection molding system according to another exemplary embodiment. The reference numbers from FIG. 2 are repeated in FIG. 12 and as such, the description of those reference numbers are omitted herein. Only the differences will be described.

The injection molding machine 2 includes a supplying unit 71 for supplying lubricant, e.g., oil, grease, etc., to regions, such as the tie-bars 64 and the rollers BR, of the injection molding machine 2 to reduce friction resistance. The lubricant is stored in the supplying unit 71 and the lubricant is supplied regularly through a tube 72. Supplying timing of the lubricant can, for example, be determined based on a production number of the molded part. The supplying unit 71 can also supply the lubricant to the plurality of rollers 32 and plurality of rollers 33 in the conveying machine 3A and conveying machine 3B via tube 73 and tube 74 respectively. The timing of supplying the lubricant to the plurality of rollers 32 and plurality of rollers 33 synchronizes with the timing of supplying the lubricant to the tie-bar 64. However, the timing of supplying the lubricant can be at different times.

Figure 13:
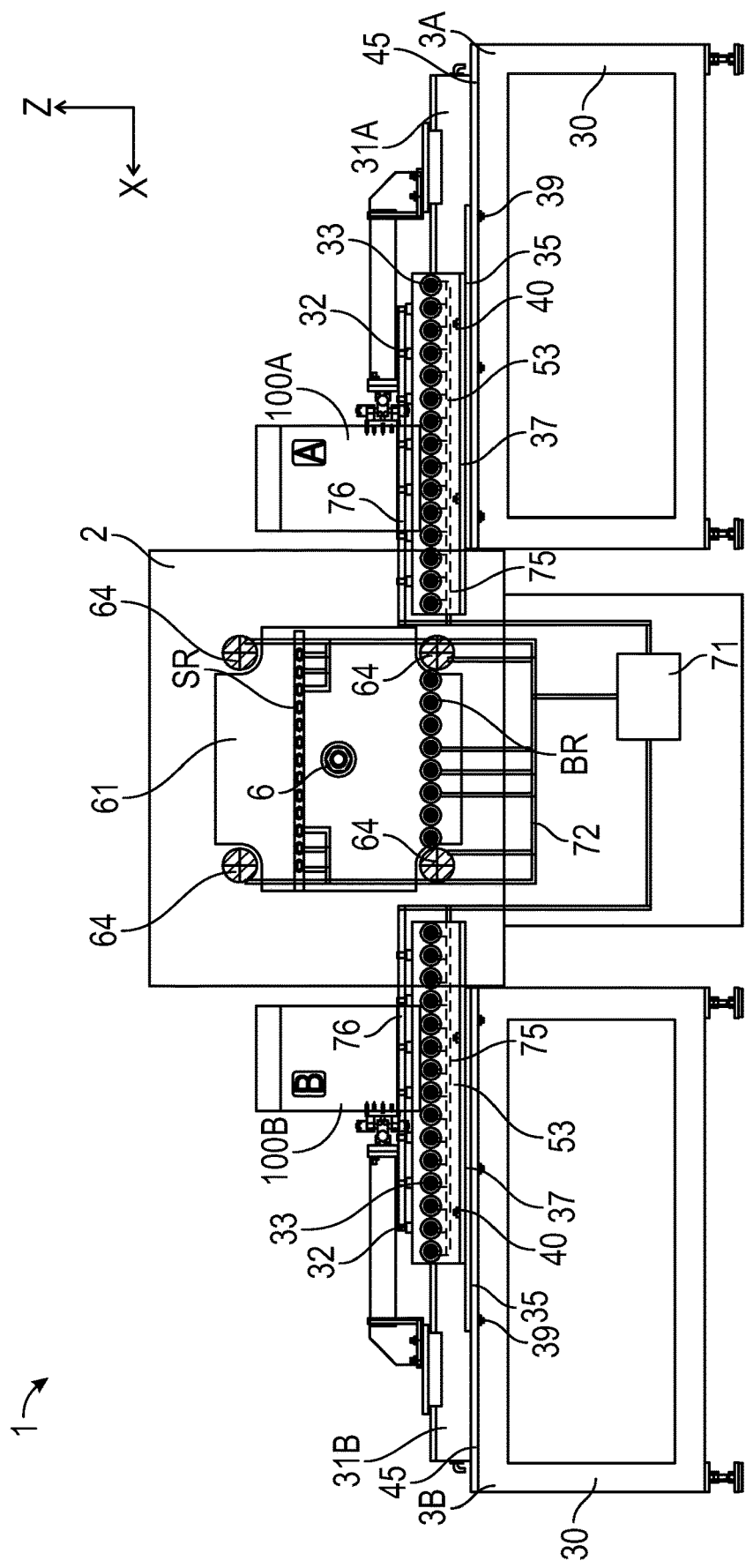
FIG. 13 illustrates an injection molding system.

FIG. 13 illustrates is a side view of an injection molding system according to another exemplary embodiment. FIG. 13 differs from FIG. 12 in that the supplying mechanism of the lubricant to the plurality of the rollers 32 and plurality of rollers 33. A tube 76 supplies the lubricant from the supplying unit 71 to the plurality of rollers 33. The tube 76 extends above (upward) the plurality of rollers 33. A flow path 75 for distributing the lubricant to the plurality of rollers 32 is located in the supporting member 53, where the lubricant is supplied from the tube 76 to the flow path 75.

Figure 14:
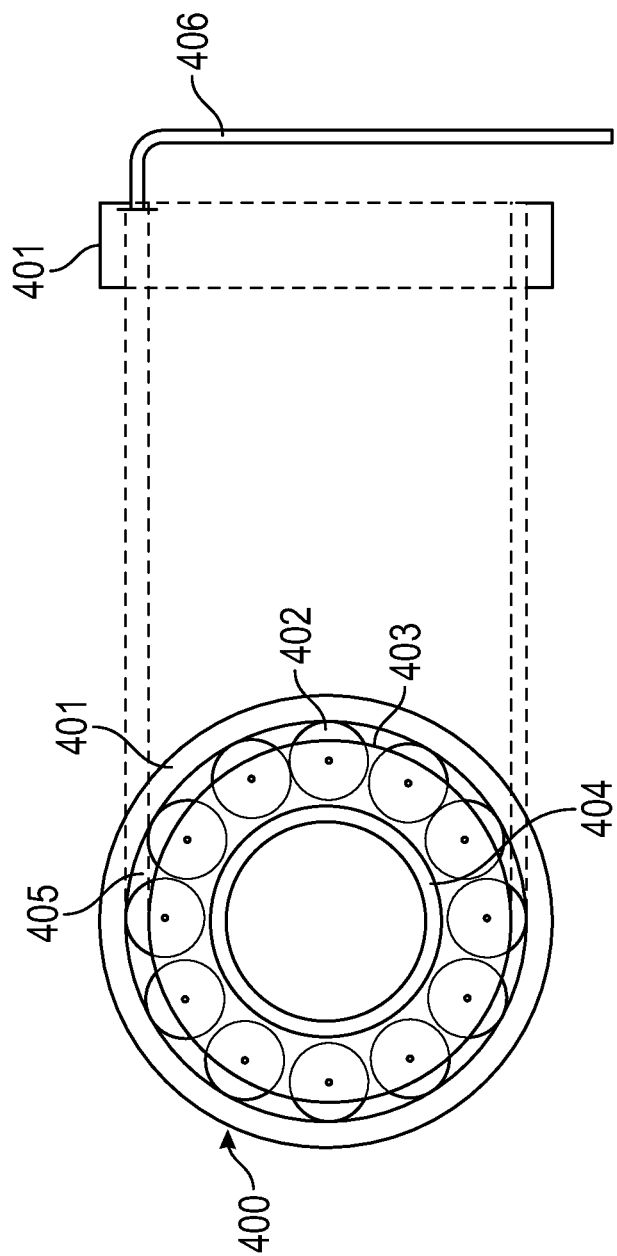
FIG. 14 illustrates a cross sectional view of a general roller bearing.

FIG. 14 illustrates a cross sectional view of general roller bearing 400 that is used for the plurality of rollers 32, the plurality of rollers 33 and the rollers BR of the present embodiment. Any roller bearing mechanism that would enable practice of the present embodiment is applicable.

In the roller bearing 400, an outer ring 401 rotates in a state where the friction is small by the function of a plurality of rolling body 402. The rolling body 402 is supported by a holder 403 in a state where a position of the rolling body 402 is fixed and the rolling body 402 is rotatable around a rotation axis of the rolling body 402. The holder 403 is fixed in a state where the holder 403 cannot rotate relative to the inner ring 404. A columnar space for a bolt (not illustrated) is formed inside the inner ring 404. The inner ring 404 is fixed to a fixing member, e.g. the supporting member 53, by the bolt. Thus, the positions of the holder 403 and the rolling body 402 are fixed. The outer ring 401 rotates relative to the inner ring 404.

The lubricant is supplied via the tube 406 to at least one of gaps 405 surrounded by an inner wall of the outer ring 401, an outer wall of the holder 403, and an outer wall of the rolling body 402. If the lubricant is supplied to at least one of the gaps 405, the lubricant flows between the rolling body 402 and the outer ring 401 based on the rotation of either the outer ring 401 or the rolling body 402, and flows to the next gap 405 across the rolling body 402. By repeating this flow, the lubricant enters each boundary surface between the rolling bodies 402 and the outer ring 401. The friction is reduced significantly based on the above-described lubricant flow. While it is preferable to locate the edge of the tube 406 near one of the boundary surfaces between the outer ring 401 and the rolling bodies 402, as the lubricant moves, it is enough to supply the lubricant to the gap 405.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

What is claimed is:

1. A conveyance apparatus for conveying a mold into an injection molding machine comprising:
    an actuator configured to convey the mold;
    a frame of the conveyance apparatus; and
    a supporting member fixed on the frame and configured to support the mold, wherein:
        the mold includes a first part connected with the actuator and a second part, with a cavity formed between the first part and the second part,
        a first clamping plate is fixed to the first part of the mold,
        a second clamping plate is fixed to the second part of the mold,
        the supporting member includes a first supporting member and a second supporting member,
        the first supporting member is configured to support the first clamping plate,
        the second supporting member is configured to support the second clamping plate,
        a section of the second supporting member extends from the base-frame into the injection molding machine in a direction of movement of the mold, and
        the second supporting member includes a mechanism for changing a position of the second supporting member relative to the frame in the direction of movement of the mold.

2. The conveyance apparatus according to claim 1, wherein the frame does not extend into the injection molding machine in the direction of movement of the mold.

3. The conveyance apparatus according to claim 1, wherein the section of the second supporting member extending into the injection molding machine includes a plurality of rollers arranged in a direction for guiding movement of the mold along the direction.

4. The conveyance apparatus according to claim 1, further comprising a fastening unit for fastening the section of the second supporting member extending into the injection molding machine.

5. The conveyance apparatus according to claim 1, wherein the actuator is located between the first supporting member and the second supporting member in a horizontal direction perpendicular to the direction of movement of the mold.

6. The conveyance apparatus according to claim 1, wherein, when the mold is conveyed, a position of the second supporting member relative to the frame does not change in the direction of movement.

7. The conveyance apparatus according to claim 1, wherein:
    a section of the first supporting member extends from the frame into the injection molding machine in the direction of movement of the mold, and
    the first supporting member includes a mechanism for changing a position of the first supporting member relative to the frame in the direction of movement of the mold.

8. An injection molding system comprising:
    an injection molding machine configured to perform injection molding with a mold; and
    the conveyance apparatus of claim 1.

9. The conveyance apparatus according to claim 1, further comprising:
    a plurality of rollers for conveying a mold in the direction of movement of the mold, wherein:
        the mold is moved along the plurality of rollers into the injection molding machine, and
        the plurality of rollers are uniformly spaced from within the injection molding machine to outside of the injection molding machine.

10. The conveyance apparatus according to claim 9, wherein the plurality of rollers are arranged in single formation that extends from within the injection molding machine to outside of the injection molding machine.

11. A conveying apparatus for conveying a mold with respect to an injection molding machine, the conveying apparatus comprising:
    a plurality of rollers for conveying a mold in a horizontal direction,
    a frame; and a supporting member fixed on the frame and configured to support moving the mold into the injection molding machine in the horizontal direction along the plurality of rollers, wherein:
- a section of the supporting member extends in the horizontal direction from the frame into the injection molding machine,
- the mold is moved into the injection molding machine in the horizontal direction along the plurality of rollers, and
- the plurality of rollers are uniformly spaced from within the injection molding machine to outside of the injection molding machine.

12. A conveying apparatus for conveying a mold with respect to an injection molding machine, the conveying apparatus comprising:
- a plurality of rollers for conveying a mold in a horizontal direction,
- a frame; and
- a supporting member fixed on the frame and configured to support moving the mold into the injection molding machine in the horizontal direction along the plurality of rollers, wherein:
  - a section of the supporting member extends in the horizontal direction from the frame into the injection molding machine, and
  - the plurality of rollers are arranged in single formation that extends from within the injection molding machine to outside of the injection molding machine.

13. A conveyance apparatus for conveying a mold into an injection molding machine comprising:
- an actuator configured to convey the mold;
- a frame of the conveyance apparatus; and
- a supporting member fixed on the frame and configured to support the mold, wherein:
  - the mold includes a first part connected with the actuator and a second part, with a cavity formed between the first part and the second part,
  - a first clamping plate is fixed to the first part of the mold,
  - a second clamping plate is fixed to the second part of the mold,
  - the supporting member includes a first supporting member and a second supporting member,
  - the first supporting member is configured to support the first clamping plate,
  - the second supporting member is configured to support the second clamping plate,
  - a section of the first supporting member extends from the frame into the injection molding machine in a direction of movement of the mold, and
  - the first supporting member includes a mechanism for changing a position of the first supporting member relative to the frame in the direction of movement of the mold.

14. The conveyance apparatus according to claim 13, wherein the frame does not extend into the injection molding machine in the direction of movement of the mold.

15. The conveyance apparatus according to claim 13, wherein the section of the first supporting member extending into the injection molding machine includes a plurality of rollers arranged in a direction for guiding movement of the mold along the direction.

16. The conveyance apparatus according to claim 13, further comprising a fastening unit for fastening the section of the first supporting member extending into the injection molding machine.

17. The conveyance apparatus according to claim 13, wherein the actuator is located between the first supporting member and the second supporting member in a horizontal direction perpendicular to the direction of movement of the mold.

18. The conveyance apparatus according to claim 13, wherein, when the mold is conveyed, a position of the first supporting member relative to the frame does not change in the direction of movement.

19. An injection molding system comprising:
- an injection molding machine configured to perform injection molding with a mold; and
- the conveyance apparatus of claim 13.

* * * * *